(12) United States Patent
Suppes (10) Patent No.: US 12,330,798 B2
(45) Date of Patent: Jun. 17, 2025

(54) FLAT PLATE AIRFOIL PLATFORM VEHICLE

(71) Applicant: THE SUPPES FAMILY TRUST, Columbia, MO (US)

(72) Inventor: Galen J. Suppes, Columbia, MO (US)

(73) Assignees: Adam Suppes, Chicago, IL (US); The Suppes Family Trust, Charlottesville, VA (US)

( * ) Notice: Subject to any disclaimer, the term of this patent is extended or adjusted under 35 U.S.C. 154(b) by 196 days.

(21) Appl. No.: 17/795,612

(22) PCT Filed: Feb. 3, 2021

(86) PCT No.: PCT/US2021/016392
§ 371 (c)(1),
(2) Date: Jul. 27, 2022

(87) PCT Pub. No.: WO2021/225651
PCT Pub. Date: Nov. 11, 2021

(65) Prior Publication Data
US 2023/0071482 A1    Mar. 9, 2023

Related U.S. Application Data

(60) Continuation of application No. PCT/US2020/036936, filed on Jun. 10, 2020, which
(Continued)

(51) Int. Cl.
*B64D 3/00* (2006.01)
*B64U 10/20* (2023.01)
(Continued)

(52) U.S. Cl.
CPC ............... *B64D 3/00* (2013.01); *B64U 20/70* (2023.01); *B64U 30/297* (2023.01); *B64U 50/31* (2023.01);
(Continued)

(58) Field of Classification Search
CPC ........ B64C 27/28; B64C 29/0033; B64D 3/00
See application file for complete search history.

(56) References Cited

U.S. PATENT DOCUMENTS

| 1,783,458 A | * | 12/1930 | Windsor | ............. B64C 29/0033 244/92 |
| 2,936,967 A | * | 5/1960 | Dancik | ............... B64C 29/0033 D12/326 |

(Continued)

FOREIGN PATENT DOCUMENTS

| CN | 108408043 A | * | 8/2018 | ............. B64C 27/26 |
| CN | 109250097 A | * | 1/2019 | ............. B64C 27/28 |

(Continued)

*Primary Examiner* — Joseph W Sanderson (57) ABSTRACT

Towed aerodynamic platforms approach the behavior of flat plate airfoils to achieve high lift-to-drag (L:D) performance when operated at low pitch angles. A lead aircraft may tow multiple platforms to form train units. Low form drag and high L:D enable solar aircraft that are more robust and faster than approaches extending wingspan rather than extending the length of the aerial train. Applications extend beyond solar aircraft and include vehicles towed along an overhead monorail system and aerial drones.

16 Claims, 3 Drawing Sheets

Related U.S. Application Data is a division of application No. 16/783,319, filed on Feb. 6, 2020, now Pat. No. 11,186,367.

(60) Provisional application No. 63/092,151, filed on Oct. 15, 2020, provisional application No. 63/054,273, filed on Jul. 21, 2020, provisional application No. 63/019,278, filed on May 2, 2020, provisional application No. 63/016,362, filed on Apr. 28, 2020.

(51) Int. Cl.
| | | |
|---|---|---|
| *B64U 20/70* | (2023.01) | |
| *B64U 30/12* | (2023.01) | |
| *B64U 30/297* | (2023.01) | |
| *B64U 50/31* | (2023.01) | |
| B64U 30/10 | (2023.01) | |
| B64U 30/293 | (2023.01) | |
| B64U 60/50 | (2023.01) | |
| B64U 101/60 | (2023.01) | |

(52) U.S. Cl.
CPC .............. *B64U 10/20* (2023.01); *B64U 30/10* (2023.01); *B64U 30/12* (2023.01); *B64U 30/293* (2023.01); *B64U 60/50* (2023.01); *B64U 2101/60* (2023.01)

(56) References Cited

U.S. PATENT DOCUMENTS

| | | | | |
|---|---|---|---|---|
| 2,936,968 | A * | 5/1960 | Mazzitelli | B64C 29/0033 244/7 C |
| 3,136,499 | A * | 6/1964 | Kessler | B64C 11/34 244/7 C |
| 3,141,633 | A * | 7/1964 | Mackay | B64C 29/0033 244/7 C |
| 4,149,688 | A * | 4/1979 | Miller, Jr. | B64C 29/0033 244/12.4 |
| 4,899,957 | A * | 2/1990 | Eickmann | B64D 35/00 244/6 |
| 6,783,096 | B2 * | 8/2004 | Baldwin | B64C 11/001 244/66 |
| 7,059,562 | B2 * | 6/2006 | Baldwin | B64C 29/0033 244/66 |
| 7,665,688 | B2 * | 2/2010 | Cylinder | B64U 30/12 244/7 C |
| 10,011,349 | B2 * | 7/2018 | Ivans | B64C 5/08 |
| 10,106,253 | B2 * | 10/2018 | Groninga | B64C 27/52 |
| 10,173,771 | B2 * | 1/2019 | Ivans | B64C 3/385 |
| 10,266,252 | B2 * | 4/2019 | Anderson | B64C 23/072 |
| 10,279,892 | B2 * | 5/2019 | Bosworth | B64C 3/385 |
| 10,351,235 | B2 * | 7/2019 | Karem | B64C 9/18 |
| 10,370,100 | B2 * | 8/2019 | Rothhaar | B64C 29/0033 |
| 10,392,107 | B2 * | 8/2019 | Har | B64D 27/24 |
| 10,518,873 | B2 * | 12/2019 | Netzer | B64D 47/08 |
| 10,589,838 | B1 * | 3/2020 | Suppes | B64D 35/04 |
| 10,597,152 | B2 * | 3/2020 | Groninga | B64U 70/80 |
| 11,186,367 | B2 * | 11/2021 | Suppes | B64C 29/0033 |
| 2009/0014599 | A1 * | 1/2009 | Cylinder | B64U 10/10 244/7 R |
| 2016/0363685 | A1 * | 12/2016 | Giordana | H01R 24/00 |
| 2017/0021927 | A1 * | 1/2017 | Giordana | G01V 3/17 |
| 2017/0023693 | A1 * | 1/2017 | Giordana | G01V 3/16 |
| 2017/0057630 | A1 * | 3/2017 | Schwaiger | B64C 27/026 |
| 2018/0057157 | A1 * | 3/2018 | Groninga | B64C 27/20 |
| 2018/0178910 | A1 * | 6/2018 | Har | B64C 3/385 |
| 2018/0215465 | A1 * | 8/2018 | Renteria | B64C 27/02 |
| 2018/0370625 | A1 * | 12/2018 | Netzer | B64C 27/28 |
| 2019/0031333 | A1 * | 1/2019 | Groninga | B64C 39/008 |
| 2019/0241260 | A1 * | 8/2019 | Alhussan | B64C 39/024 |
| 2019/0291859 | A1 * | 9/2019 | Manning | B64U 50/11 |
| 2020/0010182 | A1 * | 1/2020 | Renteria | B64U 10/20 |
| 2020/0086971 | A1 * | 3/2020 | Heeringa | B64C 5/08 |
| 2020/0255128 | A1 * | 8/2020 | Suppes | B64U 10/14 |
| 2020/0391859 | A1 * | 12/2020 | Groninga | B64C 29/0033 |
| 2024/0051688 | A1 * | 2/2024 | Valero | B64U 30/10 |

FOREIGN PATENT DOCUMENTS

| | | | | |
|---|---|---|---|---|
| EP | 2690012 A1 * | 1/2014 | ............ | B64C 27/26 |
| EP | 3364218 A1 * | 8/2018 | | |
| WO | WO-2015089679 A1 * | 6/2015 | ............ | B64C 27/16 |
| WO | WO-2021029947 A2 * | 2/2021 | ............ | B64C 27/22 |

\* cited by examiner

FLAT PLATE AIRFOIL PLATFORM VEHICLE

CROSS REFERENCE TO RELATED APPLICATIONS

This application is a continuation-in-part of Provisional Appl. Ser. No. 63/019,278 filed on May 2, 2020 entitled "Multicopter with Improved Propulsor and Failsafe Operation", Ser. No. 63/016,362 filed Apr. 28, 2020 entitled "Multicopter with Improved Propulsor and Failsafe Operation", Ser. No. 63/092,151 filed on Oct. 15, 2020 entitled "Hybrid electric-Ramjet Engine", Ser. No. 63/054,273 filed on Jul. 21, 2020 entitled "Multicopter with Hybrid Engine", Non-Provisional application Ser. No. 16/783,319 filed on Feb. 6, 2020 entitled "Multicopter with Improved Failsafe Operation", and App. No. PCT/US20/36936 filed on Jun. 10, 2020 entitled "Multicopter with Improved Propulsor and Failsafe Operation". The above-listed applications are incorporated by reference in their entirety herein.

FIELD

The present invention relates to effective lifting body designs for aerial drones. More specifically this invention relates to aerial towed platforms approaching flat plate airfoil behavior with emphasis on solar power, VTOL drones, hybrid electric-fuel engines for use with the drones, and methods of improved safety and energy efficiency.

Load per area is a critical design factor for a flat plate airfoil. In theory, reducing a load by 50% leads to a 50% reduction in the steady-state air angle of attack which doubles the lift-to-drag ratio as applied to half the load; resulting in a 75% reduction in energy use.

BACKGROUND

Several contemporary solar planes are able to sustain 24/7 flight, but they tend to be slow and fragile. Their designs are based on high wing spans with solar panels on the wings. Effective use of lifting body designs and related embodiments of this invention provide a path to faster and more-robust 24/7 solar aircraft. In several embodiments, the lifting body approach enables towed aerial vehicle trains that have reduced drag due to train aerodynamics and which are robust due to pivotable connections between platforms.

SUMMARY OF THE INVENTION

For steady-state horizontal flight, air's angle of attack is equal to pitch. A flat plate airfoil at a low pitch is able to generate high lift relative to drag, where the lift-to-drag ratios ("L:D") can approach the reciprocal of the pitch value in radians. Preferred cruising pitch angles are between 0.01 and 5 degrees, more preferably between 0.05 and 2 degrees, and most-preferably between 0.1 and 1 degree. Particularly advantageous applications of flat plate airfoils are at low, evenly-distributed loads that are towed by a forward hinge joint that enables aerodynamic forces to balance lift with load to attain flight at optimal pitches.

DESCRIPTION OF INVENTION

An aerial vehicle according to various aspects of this present invention employs an aerial towed platform 1 comprising a flat plate airfoil 2 pivotally connected to a propulsion means having a propulsor 3 through a forward joint 4. The flat plate airfoil 2 comprises a sheet 5, a rounded leading edge 6, a trailing edge 7, an average chord length, two sides 8, an average span between the sides 8, and a distributed load. The sheet 5 has an upper aerodynamic surface 9 for generating lift and a lower aerodynamic surface 10 for generating additional lift. The flat plate airfoil's average chord length is greater than its average span.

Figures 1, 2, 4, 5:
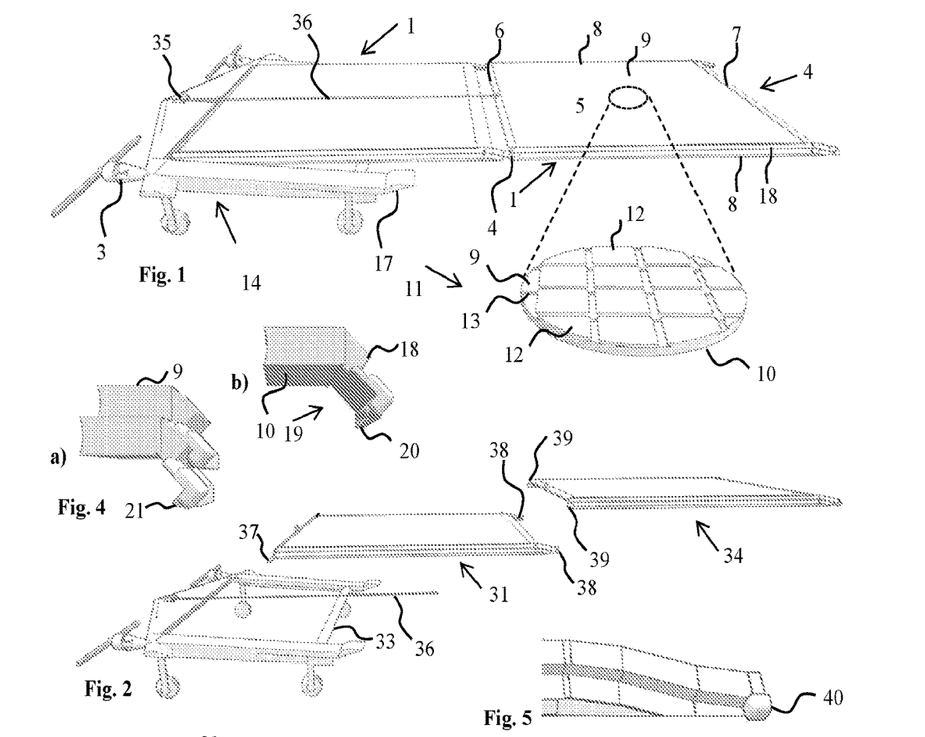
FIG. 1 is an illustration of flying towed platform train with insert of solar cell array.
FIG. 2 is a flying towed platform train of FIG. 1 illustrating lead vehicle, primary aerial towed platform, and second aerial towed platform as disconnected units.
FIG. 4 is an illustration of part of one side of an aerial towed platform as a) two sides stacked one on top of the other and b) a single side.
FIG. 5 is an illustration of the trailing end of the side with a lower guide and bumper.

A preferred distributed load is an evenly distributed load comprising an array 11 of solar cells 12 on the upper aerodynamic surface 9 of the sheet 5 with the array 11 comprising a circuit 13 connecting the solar cells 12. Preferably, the propulsion means is at least of one of a lead aircraft 14, a linear motor 15, and a tractor. Preferably, the forward joint 4 is at least one of a hinge joint, a pin joint, and a ball joint. FIG. 1. illustrates a lead aircraft 14 pulling the aerial towed platform 1 with a liftpath traversing two pivotable connections.

For a perfectly flat sheet 5 with an evenly distributed load, the weight of the distributed load is equal and opposite lift locally and on the larger scale. This substantially eliminates stress on the sheet 5 during steady-state flight allowing use of light-weight sheet materials without structural reinforcement. This reduces load, reduces pitch, increases L:D, and leads to high energy efficiency. Preferred loads on the platform 1 are less than 5 lb per ft$^2$, more preferably less than 2 lb/ft$^2$, and most preferably less than 0.5 lb/ft$^2$.

A solar cell array 11 towed, where torque passively balances about the forward joint 4 at the more-preferred pitch, is able to collect greater than 20× the power needed to sustain flight (overcome drag). Example sheet 5 materials are a canvas, a metal sheet, a composite sheet, a corrugated plastic, and a corrugated board all characterized by a low thickness.

Figure 3:
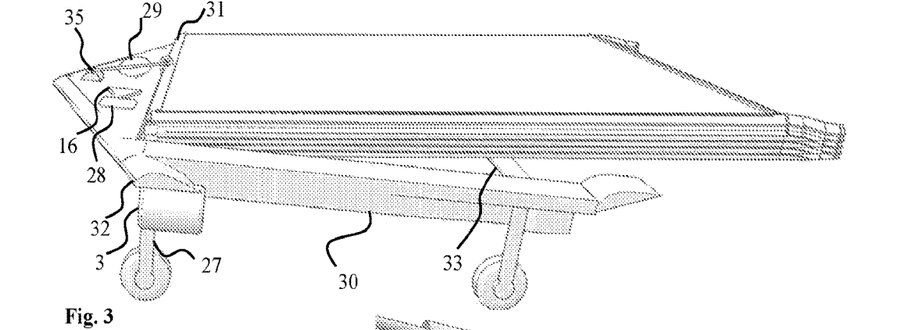
FIG. 3 is an illustration of a flat plate airfoil aircraft with four stacked platforms on the primary flat plate airfoil platform.

Multiple aerial towed platforms 1 may be pulled by one lead aircraft 14 forming a train which reduces form drag while having flexibility that increases robustness. FIG. 2 illustrates separate components that form a train. FIG. 3 illustrates a flat plate airfoil aircraft where multiple plates 1 are stacked to provide a more-robust structure for takeoff and landing. FIG. 4 provides a close-up illustration of the side 8 and a stacked side.

Towed configurations are inherently stable in pitch provided the forward joint 4 is toward the leading edge 6 of the towed platform 1. Preferably, the forward joint 4 is in the front 25% of the platform; more preferably within the front 10% of the platform 1, or even extended in front of the leading edge (see FIG. 8). In this configuration, aerodynamic forces generate lift torque that balances load at the more-preferred steady-state flight pitch without need for active control of the pitch angle. While a towed platform has passive pitch, roll, and yaw stability; a preferred aerial towed platform 1 has a control means 16 comprising at least one of ailerons 17, flaps, and a horizontal stabilizer. Most-preferred is use of ailerons to reduce chaotic variation (e.g. response to turbulence) in the platform 1 pitch.

Preferably, the aerial towed platform 1 has sides 8 of vertical inclination wherein the sides 8 are at least one of guideways 18, fences 19, a sealing air pocket perimeter 20, and guiding protrusions 21. Vertical components of sides 8 create resistance to lateral air flow.

FIG. 4 illustrates a side 8 design capable of being 3D-printed. For a 3D-printed side, the protrusion 21 may be a nub of plastic, and the same side 8 may provide a guideway 18, fence 19, protrusion 21, and perimeter 20 to trap air between stacked platforms 1. Trapping of air between stacked platforms 1 can create a hovercraft type of action when extending or retracting platforms 1. Example guiding protrusions 21 are selected from a group comprising wheels, slides, nubs, balls, and knobs that may follow a guideway 18. Example guideways are rails, raceways, and grooves.

Figure 7:
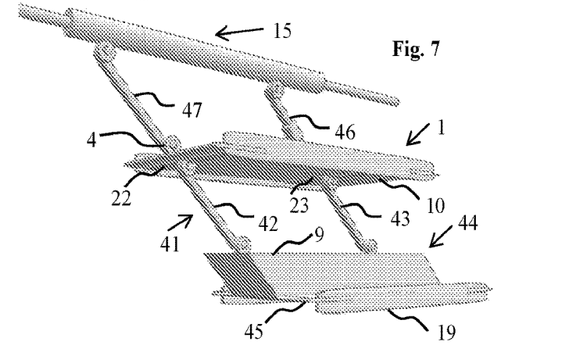
FIG. 7 is an illustration of a towed aerial platform attached above a fuselage.

FIG. 7 illustrates an application of the platform 1 alternative to solar aircraft. The distributed load of that platform 1 is distributed through a forward lateral structure 22 and a trailing lateral structure 23 where the forward lateral structure 22 pivotally connects to a forward arm 24 of a swaywing 25 on the lower aerodynamic surface 10. The trailing lateral structure 23 pivotally connects to a trailing arm 26 of the swaywing 25 on the lower aerodynamic surface 10. The swaywing 25 system is connected to a payload 29 compartment. In this configuration, a lateral tensile stress with a convex-upward camber is formed on the sheet 5 between the lateral structures 22 23 due to the lift forces. This camber structure is also light in weight and facilitates high L:D, provided the camber arc is minimal. U.S. patent application Ser. No. 16/783,319 provides further discussion of the swaywing.

Flat Plate Airfoil Aircraft—A problem with the rectangular flat plate airfoils is pitch instability during takeoff. If this instability is not addressed, the nose of an aircraft could flip up and over the trailing edge during takeoff. A preferred solution is a flat plate airfoil aircraft comprising a landing gear system 27, an energy storage means 28, a control system 16, a payload 29, and a tiltwing 30 pivotally connected to a primary flat plate airfoil platform 31 by a forward joint 4. The tiltwing 30 is comprised of at least one tiltwing airfoil 32, at least one propulsor 3, and a pitch control means 16; the energy storage means 28 is configured to power the propulsor 3; and the control system 16 is configured to control both the propulsor 3 and the tiltwing 30 pitch. A more-general version of the present embodiment is where the primary flat plate airfoil is a primary platform of platform type of FIGS. 1, 3, and 8-11.

In this embodiment, the pitch of the primary flat plate airfoil platform 31 is lower than the tiltwing 30 pitch at a runway takeoff velocity since aerodynamic forces lift the trailing edge of the flat plate airfoil platform 31 relative to its forward joint 14. Preferably, the tiltwing 30 has at least one of flaps, ailerons 17, and horizontal stabilizers wherein the control means 16 controls at least one of roll, pitch, and yaw.

Preferably, a pivot resistance device 41 limits the degrees of pitch of the flat plate airfoil 2 relative to the tiltwing 30 to less than 45 degrees. Examples of a pivot resistance devices includes hinge springs, pads 33, bumpers, and springs; all of which functionally limit the degree with which the flat plat airfoil is able to rotate relative to the tiltwing 30.

Preferably, the pivot resistance devices 41 include at least one pad 33. Preferably, the landing gear system 27 is attached to the tiltwing 30, and the flat plate airfoil 2 rests on the pad 33 when the flat plate airfoil aircraft is parked. In this embodiment, tiltwing 30 is broadly defined as a device including a wing attached to a propulsor; and more specifically in this embodiment, it is substantially an aircraft in its own right where that aircraft is able to pivot to positive pitch relative to the flat plate airfoil (see FIG. 3).

For this flat plate airfoil aircraft, preferably, a second towed platform 34 is stacked above the primary flat plate airfoil platform 31, and the second towed platform 34 is extended behind the primary flat plate airfoil platform 31 during flight. Preferably, the flat plate airfoil aircraft includes a towed platform extension means 44; said towed platform extension means 44 comprising a guideway 18, a winch 35, a cable 36, and a guiding protrusion 21; said guiding protrusion 21 functionally following the guideway 18. Preferably, the payload 29 is attached to the tiltwing 30 and is at least one of batteries, fuel cells, fuel tank, communication electronics, radar, imagery equipment, aircraft hangar, aircraft, hydrogen tank, passenger cabin, freight compartment, pod transfer devices, passenger transfer cabin, spacecraft launcher, and chemical production process. The tiltwing 30 embodiment goes beyond the traditional definition of a tiltwing, up to the option for including air frame, landing gear, and payload features as part of the tiltwing 30.

Flying Towed Platform Train—A flying towed platform train is comprised of a lead aircraft 14 followed by a primary aerial towed platform 31 followed by at least a second aerial towed platform 33. The primary aerial towed platform 31 includes a primary flat plate airfoil platform 31, a forward joint 4, a first forward connection 37, and a first aft connection 38; the second aerial towed platform 33 includes a second towed platform 34 and a second forward connection 39; and the primary and secondary flat plate airfoil platforms 31 33 are preferably aerial towed platforms 1 as described in the first paragraph of Invention Description. The towed platform train includes at least the first forward connection 37 pivotally connected to the lead aircraft 14 and the second forward connection 39 pivotally connected to the first aft connection 38.

The preferred flying towed platform train includes arrays 11 of solar cells 12 on the upper aerodynamic surfaces 9 of the sheets 5 where the arrays 11 include at least one circuit 13 connecting the solar cells 12. At least one circuit 13 connects to the lead aircraft 14, and the solar cells 12 provide electrical power to the lead aircraft 14. The most preferred flying towed platform train includes a payload 29 connected to the lead aircraft 14

Figure 6:
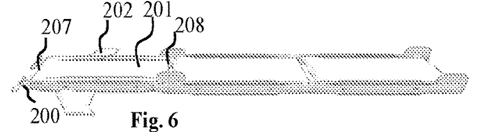
FIG. 6 is an illustration of flying towed platform train.

Longer train units may be formed by adding more platforms 1 connected similar to how the secondary platform 33 is connected to the primary platform 31 as illustrated by FIG. 6. When stacked on the primary flat plate airfoil platform 31, platforms higher in the stack may rest on those lower in the stack on pads attached to sheets of a thickness to provide weight support through to a support structure under the primary platform 31. These pads may be of a low-friction material to allow platforms to slide off during extension. Also, an air pocket may be created between platforms to assist with extension by opening an air inlet between platforms with a resistance to air leaving the space between platforms by a sealing perimeter (e.g. like a hovercraft). Various locking mechanisms and keys along the cable may be used to sequentially extend the platforms in flight. It is also possible to attach platforms delivered by a delivery vehicle during flight. Platform average thickness is preferably less than one fifth the platform's width, more preferably less than one tenth.

When extending, protrusions 21 follow the guideways 18 first in a parallel path to the lower platform, but at the end of the guideway, the guideway bends downward so that sequential platform sheets are aerodynamically aligned (see FIG. 5). Methods known in the science and art may be used to provide smooth and streamlined air flow along platforms in a train sequence. A bumper 40 on the trailing end of the guideway stops further extension, and can form a pivotable joint in combination with a protrusion 21 and guideway 18.

Flying Train Overhead Monorail—The FIG. 7 transportation system 41 is comprised of a linear motor 15 propelling along an overhead monorail, an aerial towed platform 1 (as described in first paragraph of Invention Description) pivotally connected to the linear motor 15, and a swaywing 25 connection between the aerial towed platform 1 and a fuselage 44. The fuselage has a median width. The swaywing 25 is comprised of a forward fuselage arm 42 pivotally connecting a forward upper aerodynamic surface 9 of the fuselage to a forward lower aerodynamic surface of the aerial towed platform 1, a trailing fuselage arm 43 pivotally connecting a trailing upper aerodynamic surface 9 of the fuselage to a trailing lower aerodynamic surface of the aerial towed platform 1, and an air gap between the aerial towed platform 1 and the fuselage. As the linear motor pulls the platform 1 forward, forward velocity induces aerodynamic lift on both the aerial towed platform 1 and the fuselage 44 wherein the fuselage 44 swings toward the aerial towed platform 1.

Preferably, a fuselage flat plate platform 45 is attached to the bottom of the fuselage 44 and is configured substantially parallel to the aerial towed platform 1. The performance advantage of this transportation system 41 is a high L:D within a narrow transit corridor. The combined low pitch surface areas of the two platforms 1 45 and the fuselage's upper low-pitch surface 9 approximately double the low-pitch aerodynamic lift area. The highest L:D is achieved when the two platforms 1 45 are substantially parallel. An approximate doubling of overall L:D, due to a doubling of low-pitch surface areas, approximately doubles the fuel economy as compared to the fuselage and lower platform 45 alone.

Preferably: the forward arm 42 and trailing arm 43 are of equal length and parallel; the two platforms 1 45 have spans at least 50% greater than the median width of the fuselage 44; and both platforms 1 45 have fences 19 as part of their sides 8 to reduce lateral air flow. More preferably, the two platforms 1 45 have median spans between 1.5× and 3× the median width of the fuselage 44.

The gap between the fuselages upper surface 9 and the towed platform's 1 lower surface 10 decreases as velocity increases and the fuselage 44 swings back and up. The two surfaces may contact at higher velocities. Preferably, the maximum gap is between 0.4× and 3× the parked median pitch displacement of the upper platform 1 where pitch displacement is approximately the median length of the platform 1 multiplied times the pitch angle in radians. Preferred parked platform pitch angles are between 2 and 10 degrees and more preferably between 3 and 7 degrees. Cruising pitch angles are preferably between 0.2 and 5 degrees, and more preferably between 0.5 and 3 degrees.

Initial pitch angles are set by the length of a trailing motor connection 46 (between the towed platform 1 and the linear motor 15) relative to the forward motor connection 47. The pitch of the linear motor 15 is a reference value of zero. The trailing connection 46 may decrease in length (e.g. elastic or comprising a spring) to decrease the pitch of the towed platform 1 as velocity increases. At rest, the linear motor 15 may support the weight of both platforms 1 45 and the fuselage. The forward motor connection 47 comprises a forward joint 4 as previously described, and the forward motor connection 47 may include an arm to increase initial space between the linear motor 15 and the towed platform 1.

Figure 8:
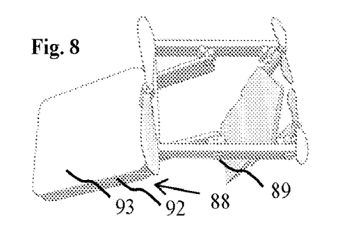
FIG. 8 is an illustration of an aerial drone with a towed platform payload compartment.

Drones with Platforms—FIG. 8 illustrates a drone comprising a towed payload compartment platform 88 and a forward joint 89 similar to the towed platform 1 previously described. Unlike the FIG. 1 towed platform 1, the payload compartment platform 88: a) has at least two sheets with a payload compartment between the sheets and b) is VTOL. The FIG. 8 compartment platform 88 is referred to as a freewing 88 for payloads. The compartment platform 88 may stack and extend platforms 1 with solar cells for power.

Figures 9, 12:
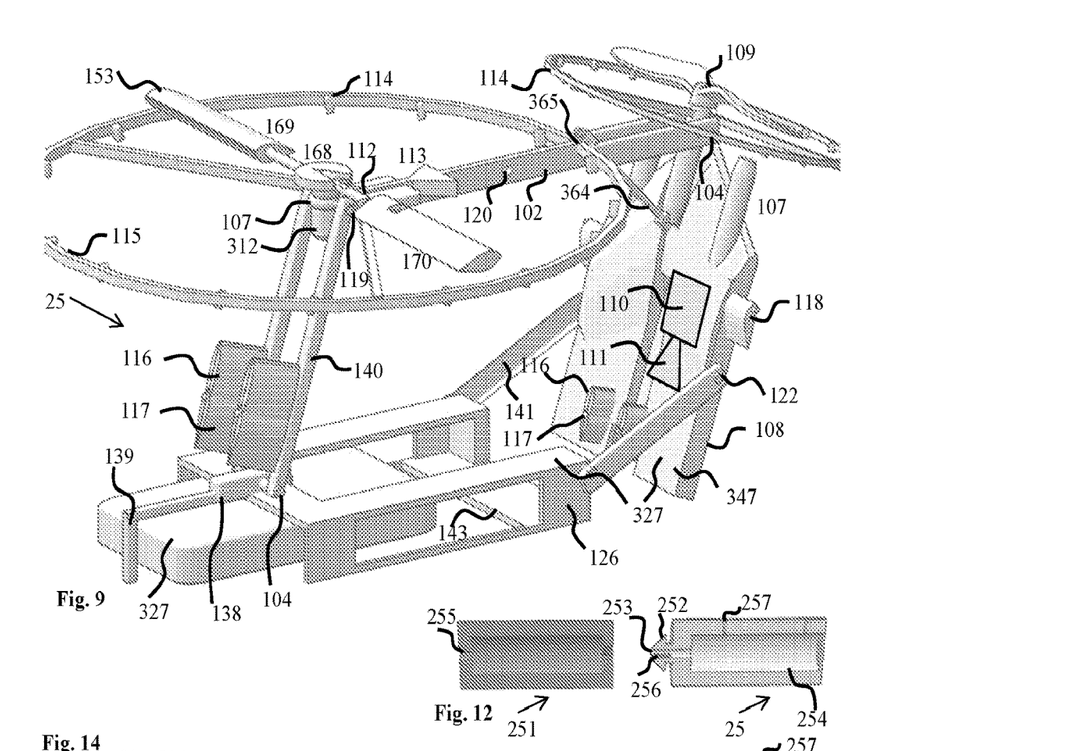
FIG. 9 is an illustration of a transformer drone with a towed platform compartment.
FIG. 12 is a cross section of 3D-printed injection mold connections.

FIG. 9 illustrates a transformer drone with a payload compartment platform. The transformer drone is a multicopter comprising a multicopter airchassis 102; a forward tilting body 103 pivotably connected [bearing 104] to the airchassis 102 and configured to pivot between a first position 105 associated with a hover flight mode and a second position 106 associated with a forward flight mode. A forward propulsor 107 is part of the front tiltwing 108; herein the forward propulsor 107 is configured to aerodynamically actuate through a range of motion along with the forward tilting body 103 due to aerodynamics about the front tiltwing 108. The forward propulsor 107 is configured for failsafe operation to vertically land without lift from other propulsors such as a midsection propulsor 312.

A further embodiment of the multicopter comprises a second forward propulsor 53 coupled to the forward tilting 108 (see FIG. 8) wherein the forward propulsor 107 and the second forward propulsor comprise a twin engine configuration on the front tiltwing 108. A VTOL vehicle of this invention uses a front tiltwing to transition from VTOL to cruising and to enable a failsafe/emergency landing method. The VTOL vehicles have an airchassis as a support structure that may be part of a fuselage or a separate structure. Embodiments apply to multicopters ranging from two to more than four propulsors.

The preferred embodiment is a multicopter comprising: a) an airchassis; b) a front tiltwing pivotably coupled to the airchassis and configured to transition between a hovering configuration and a cruising configuration, the front tiltwing including: (i) a first propulsor configured to generate at least one of thrust or lift and (ii) an aerodynamic lift surface; c) a counterbalance propulsor system coupled to the airchassis, the counterbalance propulsor system configured to balance gravitational, aerodynamic, thrust and lift forces and torques caused by the front tiltwing, the counterbalance propulsor system including a second propulsor configured to generate at least one of thrust or lift; and d) a control unit.

Figure 10:
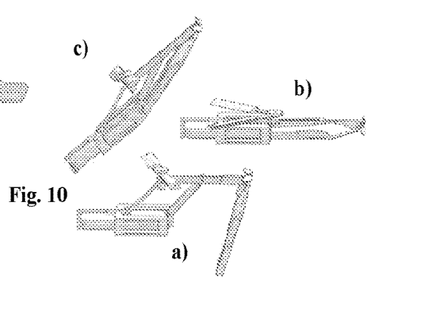
FIG. 10 is an illustration of a transformer drone in three failsafe configurations.
Figure 11:
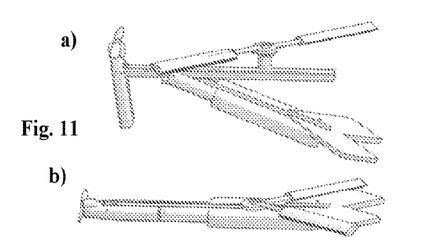
FIG. 11 is two illustrations of alternative transformer drone configuration.

The aerodynamic lift surface of the front tiltwing 103 is configured to: a) approach a near-perpendicular position relative to the airchassis 102 (see FIGS. 10a, 9) in the hovering configuration and b) approach a near-parallel position relative to the airchassis 102 (see FIGS. 10b, 11b) in the cruising configuration. The multicopter further comprises a power supply (110, FIG. 9) configured to control the thrust and lift by providing a variable amount of power to the front tiltwing wherein the control unit (111, 113, 16, or 416) is in communication with the power supply; the control unit having at least one sensor, a processor, and memory storing instructions thereon. When executed by the processor, the control unit calculates at least one of the rate of descent, yaw angle, roll angle, pitch angle or altitude of the front tiltwing based on data provided to the processor by the at least one sensor; and the control unit adjusts at least one of the rate of descent, yaw angle, roll angle, pitch angle or altitude by regulating the amount of power provided to the first propulsor by the power supply via a control signal.

As illustrated by FIG. 9, the power supply (110 or 112) and control unit (111 or 113), may be on the tiltwing, on the airchassis 102, or on other locations including redundant and interconnected configurations. Example sensors include a GPS sensor, level indicator, and velocity indicator; sensors may be built into the control unit (111, 113, 16, or 416).

Propulsors may provide lift and thrust; lift is an upward force and thrust is a horizontal force. The total propulsor force is the vector sum of thrust and lift. During steady-state flight, total lift needed to sustain flight is equal to the total multicopter weight.

In the hovering configuration, the first propulsor of the front tiltwing and the second propulsor of the counterbalance propulsor system are configured to counterbalance the gravitational force acting through the center of gravity of the multicopter. A propulsor (107, 109, or 3) may be one or more of the group: propeller, fan, rotating blade, or exhaust nozzle. In the cruising configuration, the front tiltwing's propulsor generates more thrust than lift, and the front tiltwing's aerodynamic lift surface generates lift.

Preferably, the airchassis, front tiltwing, and counterbalance propulsor system are transitionable through passive actuation to a default failsafe descent configuration, the failsafe descent configuration is conducive to landing without catastrophic damage to at least one of the airchassis, front tiltwing, counterbalance propulsor system, and a payload. Typically, passive actuation is movement due to a balance of forces (and torques) including at least gravity acting on a center of gravity and aerodynamic forces (from velocity and descent). Optional passive actuation does not preclude use of actuators. Catastrophic is defined in terms of passenger safety and highly expensive vehicle damage; by example, loss of human life and damage >20% of vehicle value of the vehicle are catastrophic.

Preferably, the multicopters of this invention have three failsafe modes (see FIG. 10) of descent, including: a) mostly vertical powered by a midsection rotor, b) mostly horizontal powered by the front tiltwing, and c) mostly vertical powered by the front tiltwing ("a-c failsafe modes"). The failsafe descent is typically triggered by a failure of a propulsor, and so, power from propulsors other than the one powering descent is negligible. An algorithm for using the a-c failsafe modes includes a key failsafe aspect to "dampen" "a)" and "c)" vertical (pseudo-autorotation) descent modes where dampen means to slow done without overdoing propulsor lift (which could lead to out of control roll, yaw, or pitch).

Preferred embodiments include a swaywing or freewing which positions at a location that both a) provides for easier loading and b) reduces resistance to hovering aerodynamics of propulsors producing lift. FIG. 9 illustrates a swaywing 25; a fuselage 44 can be a swaywing.

"Liftpath" is a term used to define efficient lift surfaces other than traditional airfoils; it is described and defined in U.S. Pat. No. 10,589,838 B1 and provisional applications cited therein. Liftpaths include aerodynamically-contiguous surfaces having air angle of attacks from 0 to 3 degrees (leading-edge up surfaces of low pitch) on relatively flat rectangular surfaces that are longitudinally longer than laterally wide. Structural or control surfaces such as actuators and ailerons (17, 118), arms (24, 26, 42, 43, 46, 47, 140), support surfaces (23), wing or blade sections, stabilizers (116), and rudders (117) (see FIGS. 1, 7, and 9) may extend from a liftpath. A preferred swaywing has a total wetted surface area and a swaywing total liftpath area where the swaywing total liftpath surface area is greater than one third the swaywing wetted surface area. The swaywing is located below the airchassis and pivotably coupled to the airchassis. Platform 1 88 surfaces 9 10 93 are examples of liftpaths.

Preferred midsection rotor transition is by aerodynamic actuation where a stopped rotor leads to the fixed-wing position and rotation leads to the rotary wing configuration. A catch may lock a first blade 169 in position relative to the fuselage (or airchassis) when aerodynamic forces cause rotation in a direction reverse that for lift generation; where after, the aerodynamic forces twist the second blade 170 about a radial axis.

Preferably, the midsection rotor is without a swashplate, and failsafe landing is in a pseudo-autorotation method with a pseudo-hovering configuration. Pseudo-autorotation method means "sort of autorotation method" and refers a moderate power supply to the rotor during descent with an increased in power three to fifteen seconds before landing to soften the landing. The pseudo-hovering configuration is one in which a rotary wing or propulsor of a high ratio of upward force relative to weight (e.g. the high ratio is >0.4) passively positions above a fuselage of a lower ratio of upward force relative to weight. The upward force is a sum of lift and drag vertical vectors. A front tiltwing is located in front of the fuselage center of gravity, and the passive stability features of a front tiltwing causes formation of the auto-hovering configuration at forward velocities less than 50 miles per hour (mph) when there is negligible lift from the counterbalance propulsor and when lift-path lift is inadequate to maintain a cruising configuration. The front tiltwing is blocked from having a lower pitch than the airchassis (more nose up is more positive) by devices such as the airchassis 102.

Characteristics of these failsafe landings include one or more of: a) the thrust generated by the first propulsor is increased to a value greater than the pseudo-hovering lift prior to landing, b) the control unit (or pilot) maintains the roll angle between about −20 degrees to about 20 degrees from horizontal, and c) a slight forward velocity during the pseudo-autorotation failsafe (see FIG. 10c) to facilitate control/stability.

Preferably aerial vehicles, including multicopters, comprise a plurality of longitudinally-extending lift-generating surfaces 327 forming a total aerodynamic lift surface area; the plurality of longitudinally-extending lift-generating surfaces including tiltwings, arms and lifting bodies such as fuselages with fuselage lifting-body surfaces, freewings, and swaywings as illustrated by FIGS. 1, 2, 3, 6, 8, 9, 10, and 11. More preferably a multicopter comprises the fuselage, the front passively-adjusting tiltwing, an arm mechanically connecting the front passively-adjusting tiltwing to the fuselage, and platform surfaces 9 10. The plurality of longitudinally-extending lift-generating surfaces align to form a liftpath in a cruising configuration. Preferably, a single front tiltwing is in front of a single fuselage. Preferred is lift of the front passively-adjusting tiltwing at less than half the lift provided by the total aerodynamic lift surface area.

Swaywings and freewings of this invention are types of fuselages. For vehicles without a swaywing or freewing, the airchassis is part of the fuselage.

Three Failsafe Modes and Midsection Rotary Wing—The afore-mentioned a-c failsafe modes are a plurality of failsafe methods for landing a multicopter where the multicopter comprises a front tiltwing, a vehicle center of gravity, a front tiltwing propulsor thrust, a front tiltwing propulsor lift, a front tiltwing propulsor force, a ratio of tiltwing propulsor thrust to lift, a front tiltwing propulsor lift, a total multicopter lift, a total multicopter thrust, a first failsafe method, and a second failsafe method. The first failsafe method (FIG. 10b) comprises transitioning the front tiltwing to a position wherein the total multicopter lift is more than four times greater than the front tiltwing propulsor lift and the tiltwing propulsor thrust is at least eighty percent of the total multicopter thrust. The second failsafe method (FIG. 10c) comprises transitioning the front tiltwing to a position where the front tiltwing propulsor lift is greater than one third of the total multicopter lift and the tiltwing propulsor lift is greater than the total multicopter thrust. Preferably, passive aerodynamic actuation transitions the tiltwing for the first failsafe method and second failsafe method. The passive aerodynamic actuation is a result of the inherent stability of the front tiltwing against stall where tiltwing propulsor thrust induces the failsafe mode. The third failsafe method (FIG. 10a) comprises transitioning a midsection rotary wing from a fixed wing position to a rotary position where the midsection rotary wing is coupled to and extends above an airchassis, and the midsection rotary wing is coupled to a power supply and a control unit. Preferred pseudo-autorotation increases and maintains lift from a propulsor or blade to >70%, preferably >99%, of the multicopter weight at least one second before impact.

The Pseudo-autorotation method increases power to propulsor just prior to landing, the rate of descent is decreased while the yaw/roll/pitch increase has not had adequate time to catastrophically roll, flip, or spin the vehicle. Just prior to landing is about 8 seconds prior to landing, but could be greater or less depending on the specific situation. Preferably, yaw is controlled by aerodynamic forces acting on vanes 114 of a duct 115 surrounding the midsection rotary wing or a tiltwing propeller, whereby the vanes 114 are configured such that aerodynamic forces on the vanes 114 provide partial yaw control. For a vehicle without a swaywing, the configuration for the first and second failsafe methods are the same with the vehicle nose upward in the tiltwing's hover failsafe landing configuration.

The second failsafe method is enabled by a front tiltwing propulsor force vector that provides a minimum torque about that center of gravity. In general, minimum torque corresponds to the closest distance of approach of the extended force vector being less than half the median width of the aircraft fuselage.

A Most-Preferred Multicopter—FIG. 9 illustrates a multicopter. Preferably, the tiltwing power supply 110 and control unit 111 are in addition to an airchassis power supply 112 and control unit 113 so as to provide for redundancy power, control, and propulsion; therein, allowing either the tiltwing or midsection rotary wing to land the multicopter. Preferably, propulsor ducts 114 have counter-torque duct vanes 115 along inner surfaces oriented to bend downwash air in a direction opposite the direction of travel of the rotor or propellor blade passing adjacent to the vanes 115. A vertical stabilizer 116 provides stability on a location to mount a rudder 117. Most preferably, the stabilizer 116 and rudder 117 are attached to an aft swaywing arm 140 in a manner that provides primarily roll control in the hovering configuration and primarily yaw control in the cruising configuration. Similarly, a stabilizer 116 with rudder 117 may be attached to the upper surface of the front tiltwing 108 to provide roll and yaw control.

Preferably at least one aileron 118 is on the front tiltwing 108 configured to provide roll control, most preferably including enabling of yaw control from propeller downwash.

FIG. 9 also identifies hardware for failsafe algorithm control comprised of: an airchassis 102; b a single front tiltwing 108 extending in front of the airchassis 102 said front tiltwing 108 comprising a tiltwing propulsor configuration 107, an aerodynamic lift surface 347, a tiltwing power supply 110, and a tiltwing control unit 111. The control unit 111 comprises a control signal to control the tiltwing thrust (e.g. a speed control system) and communication by hard wire or transmitter-receiver communication.

More preferred operation is a wherein the hovering configuration 105 comprises a balancing of downward force on the center of gravity, lift from the front tiltwing 108, and lift from the counterbalance propulsion configuration.

As a publication, PCT/US20/36936 application filed on Jun. 10, 2020 entitled "Multicopter with Improved Propulsor and Failsafe Operation" provides operational details related to Swaywing Positioning and Forces, Torques, and Passive Actuation to complete embodiments of this document.

Preferred Motor—Preferred propulsors of this invention include electric motors. The preferred motor has a high power density and simple, inexpensive modular design. That preferred motor is based around a stator embodiment that may be used in both motor and generator applications. The stator discs 514 and stacked-disc configurations 521 523 may be used in generators in synchronous configurations.

Figure 14:
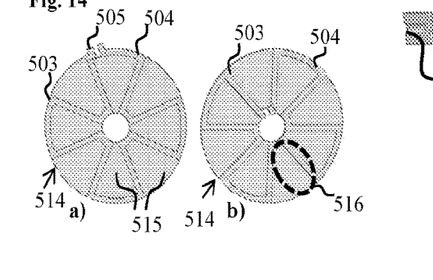
FIG. 14 is a single-circuit stator disc with a) outside and b) inside terminals.
Figure 15:
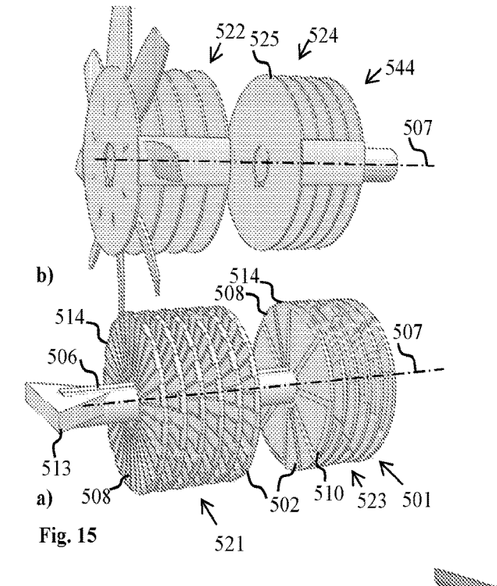
FIG. 15 illustrates a) a stator comprising a fast stator stack and a slow stator stack and b) rotors designed to engage the fast and slow stators.

The preferred motor comprises a stator system. The stator system comprises a plurality of stator discs configured about a common axis. Each stator disc of the plurality of stator discs is spaced apart and defining gaps therebetween, and each stator disc of the plurality of stator discs includes an induction circuit wherein the induction circuit does not cross itself along the common axis. The induction circuit comprises a plurality of circuit radial-direction tracks, a plurality of angular-direction tracks, and a plurality of terminals. FIG. 14 provides example discs. FIG. 15 is an example "stacked-disc configuration".

A circuit busbar connects the plurality of stator discs to a controller. The circuit bus-bar provides electric power to the plurality of stator discs. A rotor system is axially aligned with the plurality of stator discs. The rotor system includes at least one rotor; the at least one rotor positioned in one of the gaps between each stator disc of the plurality of stator discs.

Preferably: a) the circuit busbar further comprises a stationary shaft or a housing; b) a rotary device is one from a list comprising an electric motor, an electric generator, a pump, a propulsor, propeller, a hybrid jet engine, a rotating shaft, a synchronous electric motor, and an asynchronous electric motor; c) the rotary device includes a sensor, a source of electrical power, a control unit, and a flowing cooling fluid, and d) each stator disc of the plurality of stator discs includes a plurality of stator-disc cores through which at least one of ferromagnetic composite, ferromagnetic metal, air, and water may be housed. Example cooling fluids are ambient air or ambient water. A core material is simply that material through which an electromagnet induces magnetic flux. A core may be a ferromagnetic material, air, water, or essentially any material. The properties of the core impact the properties of the flux generated by an electromagnet. The rotary device's control unit and sensor with connection to the power supply may be combined in a motor control unit 513.

Figure 16:
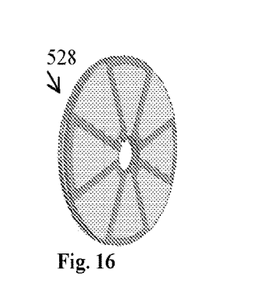
FIG. 16 is a stacking of two discs to form 1.5 loop coils.

Preferably: a) the motor comprises a plurality of induction circuits on each stator disc of the plurality of stator discs of the stator system; b) the plurality of stator discs are fabricated by at least one of 3D printing, metal stamping, laser cutting of sheet metal, or pressing of a metal wire; c) two stators from the plurality of stator discs are adjacently mounted on the circuit busbar forming a 1.5 loop stacking, the 1.5 loop stacking having an induction circuit with four radial direction tracks, an inner angular direction track, and an outer direction track, and d) the motor comprises a 1.5 loop stacking 528 (see FIG. 16) said 1.5 loop stacking 528 comprising two of the each stator discs 502 adjacently mounted on the circuit busbar 506 forming adjacently-mounted sections cumulatively forming an induction circuit 510 comprising four radial-direction tacks 503, an inner conductive angular-direction track 504, and an outer conductive angular-direction track 504.

Several options exist for the at least one rotor system. The rotor system may include: a conductive metal disc, a primary coil coupled to a rotating secondary coil and attached to a housing, an induction circuit (a continuous conductive track from connector to connector), a permanent magnet and a magnetic bearing through interaction with stator induction circuits 510. The preferred rotor system is configured to be turned via electromagnetic induction forces. Preferred stator disc configurations include: a three phase configuration comprising three angular orientations of the stator discs 502 aligned along the common axis 507, a six phase configuration comprising six angular orientations of the stator discs aligned along the common axis, a two phase configuration comprising two angular orientations of the stator discs aligned along the common axis 507, and a four phase configuration comprising four angular orientations of the stator discs 502 aligned along the common axis.

Preferably: a) the induction circuit further comprises multiple circuit sections 516, each circuit section including two radial-direction tracks 503, one angular-direction track 504, and a stator-disc core 515 and b) at least one of the circuit sections of the induction circuit includes a conductive track extension 518 and a conductive discontinuity 519 adjacent the conductive track extension. The conductive track extension, two of the radial direction tracks, one of the angular direction tracks and the conductive discontinuity form a perimeter that surrounds the stator-disc core. Also, a conduction lip on a rotor disc may be used to provide flux shielding. The conductive discontinuity 519 may be between conductive track extensions 518 from the two radial-direction tracks 503 or between outer ends of radial-direction tracks 503 and a conductive track adjacent to the stator disc's outer perimeter.

The circuit tracks are preferably conductive metal (e.g. copper) strips where electrical insulation is applied to the outer surface of the metal as known in the science to prevent electric current flow outside the metal strips. An example fabrication method is comprised of: a) laser cutting the induction circuit 510 from sheet metal, b) dip coating of the induction circuit 510 in a resin that forms an insulating layer, and c) injection molding of the stator-disc core 515 between the sides of the induction tracks at locations where it is desired to have electromagnet core material (often referred to as a composite core).

As common in the science, symmetry is preferred in design such as disc sections being axially symmetric around the axis of rotation 507. Also, a constant change/interval in angular orientations is preferred for the induction motor phase configurations.

Preferred motors comprise a slow grouping and a fast grouping, each of the slow 521 and fast groupings 523 including at least one stator disc of the plurality of stator discs and at least one rotor of the rotor system; wherein the rotor system further includes at least two rotors; wherein the at least one stator disc of the slow grouping has a different number of circuit sections within the induction circuit than the number of circuit sections within the induction circuit of the at least one stator disc of the fast grouping; and wherein the at least one rotor of the slow grouping rotates at a different speed than the at least one rotor of the fast grouping.

To assemble, a busbar shaft 531 may be designed to fit through the holes of the discs including slots through which connective busbar clips pass. A matching key on the connective clips allows a twisting action (same direction as rotor rotation) to friction fit the connective clips to the disc's terminals 505. The connection clips are designed to connect the disc terminals 505 to appropriate circuits on the busbar. The busbar may connect the disc circuits in series or parallel. Preferably, the busbar connects the disc circuits in series by alternating the ground and live wire connection along the busbar's axial length and at locations of connectivity to the discs. Washers may be used as locking devices.

3D-Printed Parts—A method for joining 3D-printed smaller structures to form a structural body may be used to produce multicopter surfaces at larger scales. A preferred structural body is comprised of a first body 250 and a second body 251 with a connector 252 having a duct 253 for flow of thermoset resin between body mold cavities 254 said cavities 254 open to an injection port 255, said duct 253 open to flow between the first body 250, and second body 251. This is illustrated by FIG. 12.

Fabrication steps required to make the structural body include: a) fabricating the first body 250 and second body 251 by a method such as 3D printing, b) connecting the bodies with the connector, c) injecting a curing-type resin (e.g. thermoset resin) into the injection part with flow of the resin through the cavities 254 and duct, and d) allowing the resin to set forming a polymer in the cavities 254 which are a mold for the resin.

Examples of connectors 252 include a ferrule connector and male inserts held in place by friction. A slot 256 may be used to facilitate slipping a male connector of the first body 250 into the female counterpart of the second body 251. The female counterpart comprises a space conforming to the male connector 252 as is common in the art. Also, the female counterpart must be open to the cavity in the second body. Examples of connectors include rivet-type molds through which resin flows and sets to connect two parts.

Preferably, the structural body contains at least one vent port 257 at an upper portion of the mold cavity 254 to allow gases to escape therein allowing resin to more-effectively fill the cavities 254. The joining surface of connecting bodies may have multiple connectors; and the connectors may have shapes and locations that better enable 3D printing. Vent ports 257 should be located at mold locations distant from the injection port 255.

3D printing of multicopter components provides for rapid prototyping and easy CAD modification with iterations in prototyping; however, the structural properties of most 3D print filaments and resins are inferior to high performance thermoset polymers. A preferred method to realize the benefits of high-performance thermoset polymers is to incorporate injection ducts and cavities in the 3D-printed components wherein the cavities are strategically placed at locations and shapes to provide extra strength where needed and wherein the ducts connect the cavities to an entrance and vent port for injecting a reacting thermoset resin. The vent port 257 is smaller (e.g. 0.2 to 1.5 mm dia.) than the injection port 255 (e.g. 2 to 5 mm dia.) so as to accommodate exiting air rather than exiting resin.

A further embodiment (FIG. 13) is a structural body wherein a longitudinal tension device 258 is in the cavity 254 and the thermoset polymer forms around the tension device 258. Preferably, the tension device 258 is in a deflected position from end-to-end of the structural body when used (straight when molded). Here, "deflected position" may be created by a vertical bar 259 near the longitudinal midsection of the cavity 254.

Figure 13:
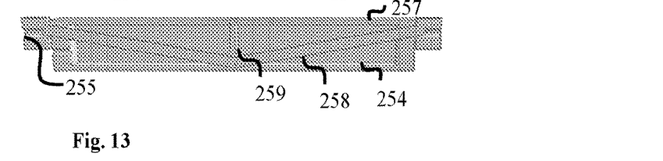
FIG. 13 is a cross section of 3D-printed injection mold of a structural beam.

Tension may be provided by clips or nuts 260 attached to the tension device 258 that push against the ends of the shell of the mold 254; preferably, an auxiliary structure is used to place tension on (and straighten) the tension device 258 when a resin is injected and cures. Example tension devices 258 are a cable and a belt. For lighter-density foams, use of a belt is advantageous to reduce localized compression forces that could crush the foam. The structural body is configured to form an injection mold around the tension device 258, similar to the first body 250 and a second body 251 as previously described. The polymer or concrete that forms in the mold 254 supplements longitudinal compression strength that vectors into reduced vertical deflection by encasing the tension device 258 in a rigid matrix. Application of this technology is to make stronger and larger parts from smaller 3D printed parts including use to 3D print multicopters and to make light-weight structural beams.

Preferred Lift-Distribution Algorithm—Flat plate airfoils (i.e. chord>span) have rapidly increasing L:D>50 as pitch (same as air angle of attack) proceeds from 1° to 0° with a singularity at 0°. Better wings (i.e. chord <0.5 span) will tend to have pitch ranges of at least 6° where L:D is >15 (but typically less than 70). The FIG. 17 preferred algorithm realizes the best of both airfoil types. Definitions for this algorithm include: change or change in (Δ), Thrust Load Signal (TLS) which is a function of total thrust, Flat Plate Platform (FPP) which is actively controlled by a force transfer device between the FPP and wing, and set point (SP). SP is a threshold value of change sufficient to warrant adjustment. In more-general terms, this algorithm seeks to minimize thrust by transferring lift between a platform and a wing. A linear actuator in series with a spring that connects the platform 1 to the wing (in addition to a pivotable joint) is an example of a force transfer device.

Figure 17:
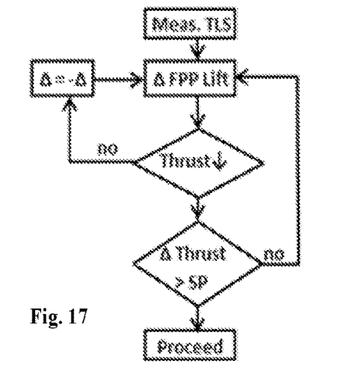
FIG. 17 is an algorithm for active control of platform pitch relative to wing pitch.

A statistical process control (SPC) method is also a good option. An SPC method is based around a target velocity at a target pressure (e.g. 400 mph at 0.2 atm for cruising, 130 mph @ 1.0 atm for takeoff) and a targeted load. SPC is achieved by configuring a wing size/design that provides a 0.2° to 2° pitch on the FPP for cruising, 3° to 7° pitch on the FPP for takeoff, and preferably both. More preferred for cruising is a pitch between 0.3° and 1°.

Figure 18:
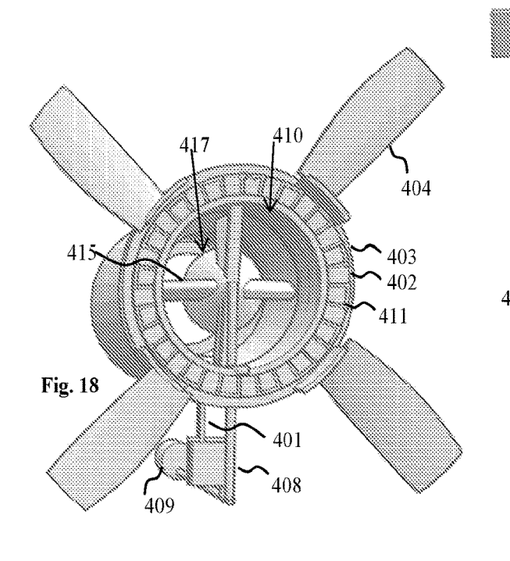
FIG. 18 is a hybrid electric-fuel engine with freely rotating combustor.
Figure 19:
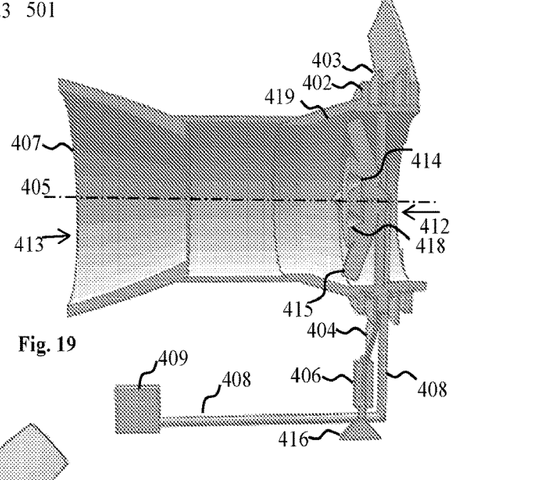
FIG. 19 is a cross section of the FIG. 18 hybrid electric-fuel engine.

Preferred Hybrid Engine—For higher-speeds (e.g. >300 mph) the preferred aerial vehicle propulsor is a hybrid engine in which the same fuel (e.g. hydrogen, ammonia) is used to provide power to fuel cells and a combustor such as illustrated by FIGS. 18 and 19. A preferred hybrid electric-fuel engine comprises an electric motor, a motor circuit 401, an axial-flux stator 402, a rotor 403, a propeller 404, a longitudinal axis 405 of rotation, a fuel cell 406, a combustor, a combustor discharge nozzle 407, a fuel line 408, a first thrust mode, a second thrust mode, and a fuel tank 409. Said axial-flux stator 402 comprises an open motor core 410, a connection to an aircraft, electromagnetics angularly spaced around said core, and an axial air flow through said core and along the longitudinal axis 405 of rotation, wherein the axial-flux stator 402 is configured to rotate the rotor 403 and propeller 404 to provide propeller 404 thrust. The motor circuit 401, fuel cell 406, fuel line 408, and fuel tank 409 are configured to power the axial-stacked stator 402. The combustor comprises an air entrance 412, an air exit 413, and a fuel nozzle 414, said combustor is configured with the fuel line 408 and fuel tank 409 to provide jet thrust. The first thrust mode comprises only propeller 404 thrust; said second thrust mode comprises both propeller 404 and jet thrust.

More preferably, the open motor core 410 is configured to direct air into the air entrance 412; where the directed air may be from 5% to 100% of the air flowing through said core. A propeller 404 thrust efficiency is defined as thrust energy divided by the energy of the fuel used to generate that thrust. A jet thrust efficiency defined as thrust energy divided by the energy of the fuel used to generate the jet thrust. Preferred operations comprise a control system 416 and a transition velocity for transitioning from the first thrust mode to the second thrust mode where the transition velocity is where the propeller 404 thrust efficiency has decreased with increasing velocity until it is equal to the jet thrust efficiency. Propeller 404 blades may extend radially into the open motor core 410, radially outward, or both radially inward and outward; and the propeller 404 blades may fold back at higher velocity to enable a thrust mode without propeller 404 operation such as a ram jet mode of operation.

More preferably, a freely rotating combustor 417 with blades 415 rotates about the longitudinal axis 405 of rotation near the air entrance 412 and within the open motor core 410 and comprising a fuel inlet, a fuel nozzle 414, a combustion bell 418, a forward blade surface, and trailing blade surface said combustion bell 418 located on the trailing side of the rotating combustor 417 between the forward and trailing blade surfaces. The nozzle discharges fuel in the combustion bell 418 and the fuel burns to form a thrust wherein the rotating combustor 417 is configured to vector thrust in both angular and forward directions. Preferably, the angular rotation directs air into the combustor to feed the combustion bell 418 with air.

Combustion generates a burner thrust on the rotating combustor 417, and the burner thrust is transferred to an aircraft to sustain or achieve higher-velocity flight. Velocities may exceed mach 1. More-preferred rotating combustor's blades 415 are high-pitch blades 415 with preferred pitch angles between 50 and 85 degrees. This translates to subsonic blade velocities even when velocities are supersonic. Preferably, multiple blades are spaced angularly and longitudinally on the rotating combustor to allow thrust transfer along the entire vertical-lateral plane extending around the rotating combustor to duct walls 419 containing the combustion. Duct walls 419 may be the same as said core's walls, or they may be separate when a propeller 494 (i.e. fan) rotates inside said core.

Figure 20:
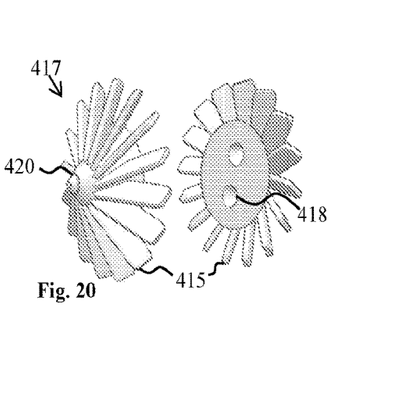
FIG. 20 front and back views or rotating combustor of hybrid electric-fuel engine.

The rotating combustor is configured to rotate with minimal resistance to air flow while providing a surface for burner thrust to be directed to the aircraft to which the hybrid electric-fuel engine is connected. FIG. 20 shows a bearing sleeve 420 on which a bearing is mounted to enable rotation and thrust force transfer. The preferred rotating combustor comprises centrifugal air flow vanes on the front surface nose, multiple high pitch blades, back-side combustion bells, and backside surfaces configured to collect thrust force in a mostly forward vector but with complement to rotation to optimize performance.

The embodiments of this invention have common applications in solar planes and transformer drones. This invention includes use of the embodiments in combinations and applications beyond specific illustrations of this document.

The invention claimed is:

1. A lifting body surface, said lifting body surface pivotally connected to a propulsion means through a pivoting connection, the connection pivoting about a later axis, in a front 25% of said lifting body surface;
   said lifting body surface comprising a sheet, a leading edge, a trailing edge, an average chord length, two sides, an average span between said sides, and a distributed load;
   wherein the average chord length is greater than the average span, and
   wherein the lifting body surface is configured to operate as a flat plate airfoil.

2. The lifting body surface of claim 1,
   wherein the distributed load is an evenly distributed load comprising an array of solar cells on the upper surface of the sheet, said array comprising a circuit connecting the solar cells;
   wherein the lifting body surface is flat and rectangular.

3. The lifting body surface of claim 1; wherein said propulsion means is selected from the group comprising: a lead aircraft, a linear motor, and a tractor; wherein said connection is selected from the group comprising: hinge joint, a pin joint, and a ball joint.

4. The lifting body surface of claim 1 comprising a control means, said control means is selected from the group comprising: ailerons, flaps, and a horizontal stabilizer;
   wherein said sheet is selected from the group comprising: a flat plate, a canvas, a corrugated plastic, and a corrugated board.

5. The lifting body surface of claim 1 further comprising a pivot resistance device that limits the degrees of pitch of said lifting body surface relative to a tiltwing.

6. An aerial vehicle comprising:
   a plurality of lift-generating surfaces,
   said plurality comprising a lifting body surface and a tiltwing;
   said plurality of lift generating surfaces configured to form a liftpath;
   said tiltwing pivotably coupled to said lifting body surface and having at least one tiltwing propulsor;
   wherein said liftpath is an approximately-flat aerodynamically-contiguous rectangular surface longitudinally longer than laterally wide.

7. The aerial vehicle of claim 6 wherein said aerial vehicle is a multicopter;
   wherein said tiltwing is a single front passively-adjusting tiltwing in front of said lifting body surface, said lifting body surface having a single fuselage and at least one counterbalance propulsor.

8. The aerial vehicle of claim 7 wherein lift provided by the front passively-adjusting tiltwing is less than half the multicopter weight.

9. The aerial vehicle of claim 7, comprising a failsafe landing configuration and a control system capable of configuring the multicopter for a failsafe landing wherein greater than one third of the multicopter lift is generated by the tiltwing propulsor in the failsafe landing configuration.

10. The aerial vehicle of claim 6 further comprising structural surfaces extending from said approximately-flat aerodynamically-contiguous rectangular surface or control surfaces extending from said approximately-flat aerodynamically-contiguous rectangular surface.

11. The aerial vehicle of claim 6 further comprising a fuselage, wherein said liftpath has a width greater than 1.5× the median width of said fuselage.

12. A aerial vehicle comprising:
   a plurality of landing configurations,
   at least one front tiltwing having at least one tiltwing propulsor,
   a lifting body surface, and
   a failsafe vertical landing configuration using only propulsion force from said at least one tiltwing propulsor, said propulsion force having a ratio of vertical lift to horizontal thrust greater than one, and
   wherein the at least one front tiltwing is pivotally connected to the lifting body surface through a pivoting connection, the connection pivoting about a later axis, in a front 25% of the lifting body surface.

13. The aerial vehicle of claim 12, wherein a passive aerodynamic actuation configures said aerial vehicle for the failsafe vertical landing configuration, and
   wherein the at least one front tiltwing is pivotally connected to the lifting body surface through the pivoting connection, the connection pivoting about a later axis, in a front 10% of the lifting body surface.

14. The aerial vehicle of claim 12 further comprising: an additional failsafe landing configuration, wherein a total aerial vehicle lift is more than four times greater than said front tiltwing propulsor lift.

15. The aerial vehicle of claim 12, wherein said at least one front tiltwing is a single front passively-adjusting tiltwing in front of a lifting body surface, said lifting body surface having a single fuselage and at least one counterbalance propulsor.

16. The aerial vehicle of claim 12;
   the lifting body surface at least one from the group comprising a fuselage, a towed platform, a freewing, or a forward arm;
   wherein said vertical lift is greater than one third a total aerial vehicle lift;

wherein said aerial vehicle is configured to increase power to said at least one tiltwing propulsor at a time three to fifteen seconds before landing.

\* \* \* \* \*